US010689492B2

(12) United States Patent
Janssen et al.

(10) Patent No.: US 10,689,492 B2
(45) Date of Patent: Jun. 23, 2020

(54) METHOD FOR DEWATERING A POLYMER AND THE POLYMER MADE THEREFROM

(71) Applicant: Sabic Global Technologies B.V., Bergen op Zoom (NL)

(72) Inventors: Pieter Jan Antoon Janssen, Rijsbergen (NL); Nathalie Gonzalez Vidal, Barendrecht (NL); Lourdes Virginia Serna Felix, Evansville, IN (US)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 167 days.

(21) Appl. No.: 15/566,258

(22) PCT Filed: Jun. 6, 2016

(86) PCT No.: PCT/US2016/035976
§ 371 (c)(1),
(2) Date: Oct. 13, 2017

(87) PCT Pub. No.: WO2016/197086
PCT Pub. Date: Dec. 8, 2016

(65) Prior Publication Data
US 2018/0112043 A1 Apr. 26, 2018

Related U.S. Application Data
(60) Provisional application No. 62/171,402, filed on Jun. 5, 2015.

(51) Int. Cl.
| | | |
|---|---|---|
| *C08J 3/205* | (2006.01) | |
| *B29C 48/29* | (2019.01) | |
| *B29C 48/55* | (2019.01) | |
| *B29C 48/57* | (2019.01) | |
| *B29C 48/67* | (2019.01) | |
| *B29C 48/40* | (2019.01) | |
| *B29C 48/76* | (2019.01) | |
| *C08J 3/20* | (2006.01) | |
| *C08G 64/40* | (2006.01) | |
| *B29B 13/06* | (2006.01) | |
| *B29K 69/00* | (2006.01) | |
| *B29K 105/00* | (2006.01) | |

(52) U.S. Cl.
CPC .......... *C08J 3/2053* (2013.01); *B29B 13/065* (2013.01); *B29C 48/29* (2019.02); *B29C 48/402* (2019.02); *B29C 48/55* (2019.02); *B29C 48/57* (2019.02); *B29C 48/67* (2019.02); *B29C 48/761* (2019.02); *C08G 64/406* (2013.01); *C08J 3/201* (2013.01); *B29K 2069/00* (2013.01); *B29K 2105/0044* (2013.01); *C08J 2369/00* (2013.01)

(58) Field of Classification Search
CPC ......... C08J 3/2053; C08J 3/201; B29C 48/55; B29C 48/29; B29C 48/67; B29C 48/57; B29C 48/402; B29C 48/761; B29B 13/065
See application file for complete search history.

(56) References Cited

U.S. PATENT DOCUMENTS

| | | | |
|---|---|---|---|
| 4,845,193 A | | 7/1989 | Umemura et al. |
| 5,663,277 A | | 9/1997 | Isshiki et al. |
| 5,717,055 A | | 2/1998 | Hosomi et al. |
| 5,760,160 A | | 6/1998 | Isshiki et al. |
| 5,910,276 A | | 6/1999 | Guntherberg et al. |
| 5,958,316 A | | 9/1999 | Guntherberg et al. |
| 6,365,710 B1 | | 4/2002 | Wang et al. |
| 6,620,906 B1 | | 9/2003 | Elsner et al. |
| 6,811,294 B1 | | 11/2004 | Elsner et al. |
| 6,833,096 B2 | | 12/2004 | Wang et al. |
| 8,651,660 B2 | | 2/2014 | Barzak et al. |
| 2005/0215750 A1* | | 9/2005 | Koga ............... C08K 5/0008 528/196 |
| 2006/0089487 A1 | | 4/2006 | Silvi et al. |
| 2014/0295363 A1 | | 10/2014 | Sun et al. |
| 2015/0203600 A1 | | 7/2015 | Kirchhoff et al. |

FOREIGN PATENT DOCUMENTS

| | | |
|---|---|---|
| EP | 0881054 A1 | 12/1998 |
| JP | H07268106 A | 10/1995 |
| JP | H07268107 A | 10/1995 |
| JP | H07316282 A | 12/1995 |
| JP | H07330890 A | 12/1995 |

(Continued)

OTHER PUBLICATIONS

International Search Report for International Application No. PCT/US2016/035976; International Filing Date Jun. 6, 2016; dated Oct. 4, 2016; 7 pages.

(Continued)

Primary Examiner — Peter D. Mulcahy
(74) Attorney, Agent, or Firm — Cantor Colburn LLP

(57) ABSTRACT

In an embodiment, a method of dewatering a wet polymer composition comprises introducing the wet polymer composition via a polymer feed location to a powder conveying section of an extruder; wherein the wet polymer composition comprises greater than or equal to 1 wt % of water based on the total weight of the wet polymer composition; venting the water through a conveying section vent to form a dry polymer composition; melt kneading the dry polymer composition in a melt kneading section of the extruder to form a polymer melt; conveying the polymer melt in a melt conveying section of the extruder; and adding an additive in one or both of the powder conveying section and the melt conveying section.

20 Claims, 4 Drawing Sheets

(56) References Cited

FOREIGN PATENT DOCUMENTS

| JP | H0839551 A | 2/1996 |
|----|------------|--------|
| JP | H09193230 A | 7/1997 |
| JP | H10292050 A | 11/1998 |
| JP | 2000128997 A | 5/2000 |
| JP | 2002240033 A | 8/2002 |
| WO | 0001521 A1 | 1/2000 |
| WO | 03020483 A1 | 3/2003 |
| WO | 2013175448 A1 | 11/2013 |
| WO | 2014072923 A1 | 5/2014 |

OTHER PUBLICATIONS

Written Opinion of the International Search Report for International Application No. PCT/US2016/035976; International Filing Date Jun. 6, 2016; dated Oct. 4, 2016; 8 pages.

* cited by examiner

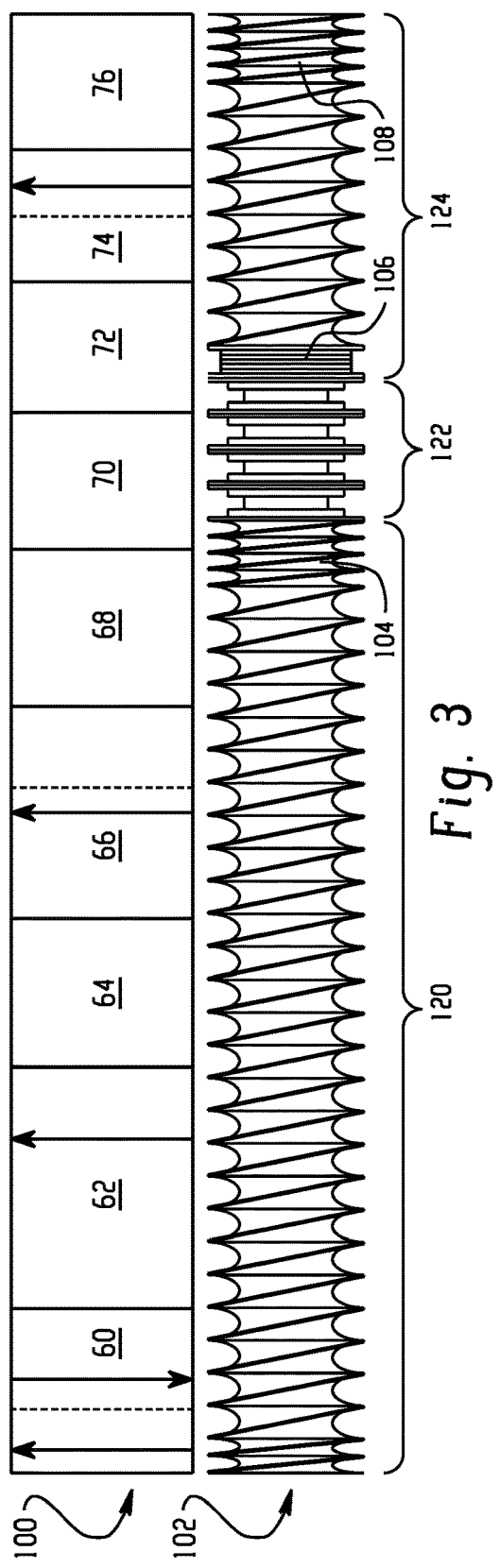
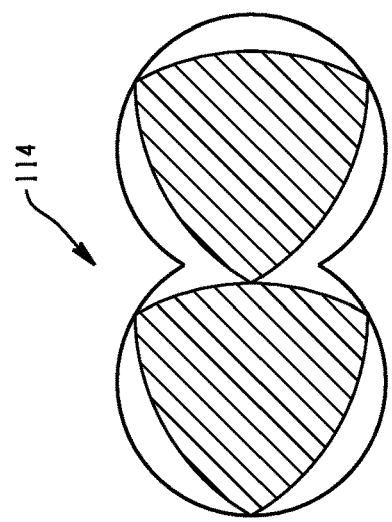
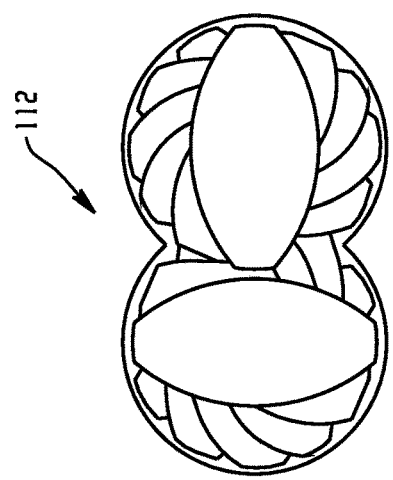
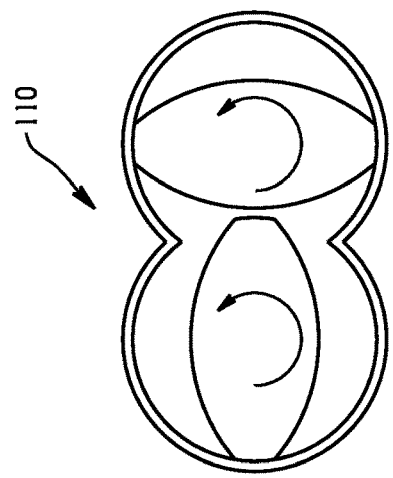
Fig. 3
Fig. 4
Fig. 5
Fig. 6

METHOD FOR DEWATERING A POLYMER AND THE POLYMER MADE THEREFROM

CROSS REFERENCE TO RELATED APPLICATIONS

This application is a National Stage application of PCT/US2016/035976, filed Jun. 6, 2016, which claims the benefit of U.S. Provisional Patent Application Ser. No. 62/171,402 filed Jun. 5, 2015, both of which are incorporated by reference in their entirety herein.

BACKGROUND

The manufacture of various polymers frequently involves a final drying step in order to remove water and other volatile components utilized in the polymerization. For example, the drying process can include drying a wet polymer powder using large industrial dryers (such as fluidized bed driers), nitrogen delivery systems, and scrubber systems to control the unwanted escape of volatile components into the environment. While such dryers are typically effective at reducing the moisture and volatile organic content of a variety of polymer powders, processes using them are relatively slow and costly. A further drawback to drying polymer powders arises as the drying process progresses, where, when the moisture level present in a polymer powder falls below a critical moisture content, the drying rate can be limited by the rates of liquid diffusion and capillary transport in the powder particles. Thus, the last stages in the drying of a polymer powder can be difficult and can require long drying times, for example, on the time scale of hours to tens of hours.

A process that more efficiently dries a polymer powder is therefore desirable. It would further be beneficial if the drying process could further produce one or both of polycarbonate pellets and extruded polycarbonate compositions comprising one or more additives.

BRIEF SUMMARY

Disclosed herein is a method of dewatering a polymer and the polymer made therefrom.

In an embodiment, a method of dewatering a wet polymer composition comprises introducing the wet polymer composition via a polymer feed location to a powder conveying section of an extruder; wherein the wet polymer composition comprises greater than or equal to 1 wt % of water based on the total weight of the wet polymer composition; venting the water through a conveying section vent to form a dry polymer composition; adding an additive; wherein the adding comprises adding an optionally liquid additive composition comprising the additive in the powder conveying section to the dry polymer composition; melt kneading the dry polymer composition in a melt kneading section of the extruder to form a polymer melt; and conveying the polymer melt in a melt conveying section of the extruder.

In another embodiment, a method of dewatering a wet polymer composition comprises introducing the wet polymer composition via a polymer feed location to a powder conveying section of an extruder; wherein the wet polymer composition comprises greater than or equal to 1 wt % of water based on the total weight of the wet polymer composition; venting the water through a conveying section vent to form a dry polymer composition; melt kneading the dry polymer composition in a melt kneading section of the extruder to form a polymer melt, wherein the melt kneading section comprises a melt kneading block; and conveying the polymer melt in a melt conveying section of the extruder; wherein the conveying introduces a shear to the polymer melt; introducing the polymer melt to a melt seal section located in the melt conveying section; wherein the melt seal comprises a reverse flighted conveying element, a dam ring, a kneading block, and a low shear element; venting the polymer melt in the melt conveying section downstream of the melt seal section; and optionally adding an additive.

In another embodiment, a method of dewatering a wet polymer composition comprises introducing the wet polymer composition via a polymer feed location to a powder conveying section of an extruder; wherein the wet polymer composition comprises greater than or equal to 1 wt % of water based on the total weight of the wet polymer composition; venting the water through a conveying section vent to form a dry polymer composition; melt kneading the dry polymer composition in a melt kneading section of the extruder to form a polymer melt; conveying the polymer melt in a melt conveying section of the extruder; and adding an additive in one or both of the powder conveying section and the melt conveying section, wherein the additive comprises 0.01 to 1 wt % of a heat stabilizer, 0.01 to 1 wt % of a release agent, 0.01 to 1 wt % of a UV stabilizer, 0 to 1 wt %, specifically, 0.1 to 1 wt % of a colorant, or a combination comprising at least one of the foregoing, all based on the total weight of the polymer and additive.

The above described and other features are exemplified by the following figures and detailed description.

BRIEF DESCRIPTION OF THE DRAWINGS

FIG. 3 is an illustration of an embodiment of a dewatering extruder; and

FIG. 4 is an illustration of an embodiment of a cross-section of a twin screw in the powder conveying section;

FIG. 5 is an illustration of an embodiment of a cross-section of a twin screw in the melt kneading conveying section;

FIG. 6 is an illustration of an embodiment of a cross-section of a twin screw in the melt conveying section;

DETAILED DESCRIPTION

Figure 1:
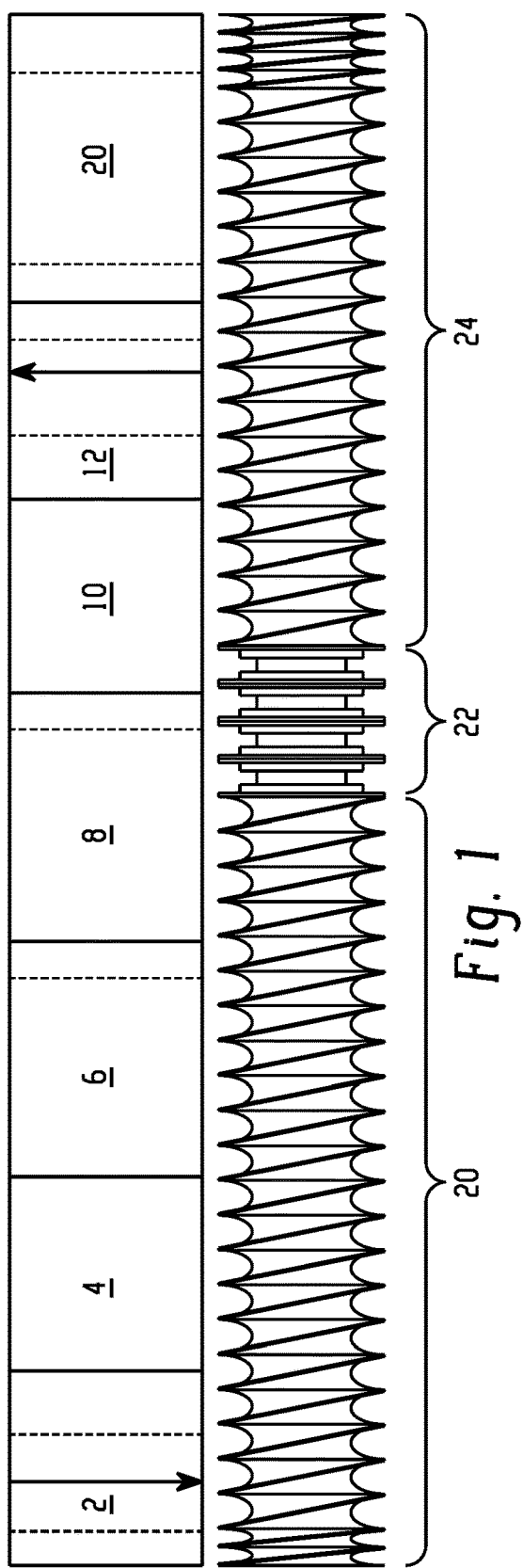
FIG. 1 is an illustration of an embodiment of a compounding extruder.

Standard methods of drying polymer powders can be time and energy intensive and can involve multiple dewatering units. For example, in typical interfacial polycarbonate polymerizations, after reaction, a polymer solution is precipitated to form a wet polycarbonate powder, the wet polycarbonate powder is dried in one or more fluidized bed dryer(s), and the dried powder is extruded in a compounding extruder. FIG. 1 is an illustration of an embodiment of a typical compounding extruder, where the extruder screw is illustrated below the extruder for ease of reference. The compounding extruder comprises powder conveying section 20, melt kneading section 22, and melt conveying section 24. Kneading elements are present in melt kneading section 22 to facilitate melting of the polymer. Using the compounding extruder, a dry polymer is fed into the powder conveying section 20 at the down arrow in barrel 2 and a venting location is present in the melt conveying section 24 at the up arrow in barrel 12.

It was surprisingly discovered that a dewatering extruder could be used to dry a wet polymer composition. The use of the dewatering extruder can reduce the need for fluidized bed-type drying operations, and allow for the dewatering in a single extrusion step. It was further found that the dewatering extruder was capable of simultaneously removing solvents and trace impurities, such as residual monomer and low molecular weight oligomers ("lows"), which can impact product characteristics such as one or more of light transmission, haze, yellowness index, and plate-out during molding of the final polymer composition. Furthermore, it was found that additives can be introduced into the extruder, so that a compound is produced, and the role of a dewatering and a compounding extruder can be combined in a single process.

Figure 2:
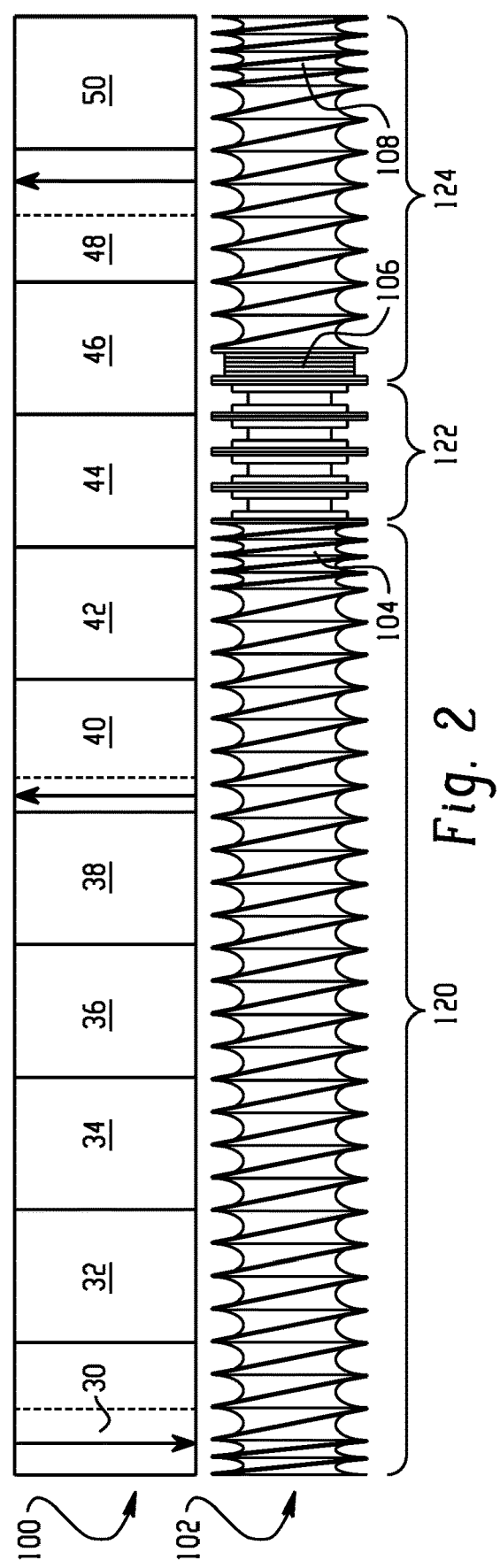
FIG. 2 is an illustration of an embodiment of a dewatering extruder.

FIGS. 2 and 3 are illustrations of embodiments of the dewatering extruder, illustrating barrel cross-section 100 and screw cross-section 102. FIG. 2 is an 11 barrel extruder comprising barrels 30-50 and FIG. 3 is an 8 barrel extruder comprising barrels 60-76. It is noted that either of these extruders can likewise comprise more or less barrels than those illustrated and that the dashed lines represent optional plates in the barrel for liquid injection. Similar to the compounding extruder of FIG. 1, the dewatering extruder comprises powder conveying section 120, melt kneading section 122, and melt conveying section 124, except that the powder conveying section 120 here dries a wet polymer powder. FIG. 2 illustrates a dewatering extruder with a polymer feed location in barrel 30 and two venting locations, one in the powder conveying section 120 in barrel 40 and one in the melt conveying section 124 in barrel 48. FIG. 3 illustrates a dewatering extruder with a polymer feed location in barrel 60 in the powder conveying section 120 and an additive feed location in barrel 68 in the powder conveying section 120. FIG. 3 further illustrates that the dewatering extruder can have four venting locations, one in the melt conveying section 124 and three in the powder conveying section 120, where the first venting location is upstream of the polymer feed location. The powder conveying section 120 can comprise powder seal section 104 such that powder exiting the powder seal section 104 enters directly into melt kneading section 122. Melt seal section 106 can be located downstream of melt kneading section 122 and upstream of the melt section vent in barrel 48 and 74 in FIG. 2 and FIG. 3, respectively. FIG. 2 and FIG. 4 illustrate that at least the last barrel in the melt conveying section 124 can comprise a pressure build-up zone 108.

The wet polymer composition comprises a liquid component. The liquid component can comprise an aqueous solvent (such as tetrahydrofuran, 1,3/1,4-dioxane, 1,3-dioxolane, water, or a combination comprising one or more of the foregoing), an organic solvent (such as a methylene chloride, ethylene dichloride, 1,2-dichloroethane, 1,1,1-trichloroethane, 1,1,2-trichloroethane, chlorobenzene, carbon tetrachloride, toluene, benzene, xylene, anisole, or a combination comprising on or more of the foregoing), or a combination comprising at least one of the foregoing.

The wet polymer composition added to the dewatering extruder can comprise greater than or equal to 1 weight percent (wt %), specifically, greater than or equal to 5 wt %, more specifically, greater than or equal to 10 wt % of a liquid component, specifically, of water based on the total weight of the wet polymer composition. The wet polymer composition added to the dewatering extruder can comprise 5 to 10 wt %, or 6 to 8 wt % of water based on the total weight of the wet polymer composition. The wet polymer added to the dewatering extruder can comprise 1 to 30 wt %, specifically, greater than or equal to 1 to 20 wt %, more specifically, greater than or equal to 10 to 20 wt % of a liquid component, specifically, of water based on the total weight of the wet polymer composition added. The wet polymer composition can comprise less than or equal to 5 wt %, specifically, greater than 0 to less than or equal to 5 wt %, specifically, 0.001 to 5 wt %, more specifically, 0.001 to 1 wt % or 0.01 to 5 wt % of halogenated solvent, such as a chlorinated solvent based on the total weight of the wet polymer composition.

Further volatile components can be removed in one or both of the powder conveying section and the melt conveying section. For example, the volatile component can comprise a residual monomer (such as, in the case of interfacial polycarbonate phosgene and a dihydroxy compound), a high boiling by-product formed during the preparation of the polymeric material (for example, diphenyl carbonate formed as a by-product during the interfacial preparation of bisphenol A polycarbonate using phenol as an endcapping agent), or a combination comprising at least one of the foregoing.

The dry polymer composition exiting the dewatering extruder can comprise less than or equal to 5 wt %, or less than or equal to 3 wt %, or less than or equal to 1 wt %, or less than or equal to 0.8 wt %, or less than or equal to 0.4 wt % of a liquid component, specifically, of water based on the total weight of the dry polymer composition exiting. The dry polymer composition can comprise less than or equal to 500 parts per million by weight (ppm) of water based on the total weight of the dry polymer composition. The dry polymer composition can comprise less than or equal to 1 ppm of a residual halogenated solvent based on the total weight of the dry polymer composition.

The dry polymer composition can have one or more of a sulfur content of less than or equal to 10 milligrams of sulfur per kilogram of the dry polymer composition, and an ionic chloride level of less than or equal to 1 milligrams of ionic chloride per kilogram of the dry polymer composition. The sulfur can originate from residuals of the co-catalyst used in the production of the dihydroxy compound such as bisphenol-A.

The dewatering extruder comprises a powder conveying section comprising a polymer feed location and greater than or equal to one powder section vent; a melt kneading section located downstream from the powder conveying section, and a melt conveying section located downstream from the melt kneading section, and comprising greater than or equal powder section vent to one melt section vent. A powder section vent can be located upstream of the polymer feed location, which can help reduce the amount of air that enters into the powder conveying section.

The dewatering extruder can comprise one or more additive feed locations. An additive feed location can be located in the powder conveying section, which can avoid air introduction to the melted polymer in the melt polymer. An additive feed location can be located in the melt conveying section.

The dewatering extruder can have a length to inner diameter ratio of greater than 40, specifically, greater than or equal to 41, or 41 to 45. The dewatering extruder can have a length to inner diameter ratio of less than or equal to 40. The dewatering extruder can have a diameter of less than or equal to 40 millimeters (mm), specifically, 15 to 30 mm. The dewatering extruder can have a diameter of greater than or equal to 40 mm, specifically, 40 to 450 mm.

The dewatering extruder comprises a screw, for example, a twin screw that rotates and conveys the material from one side of the extruder from a polymer feed location to a distal end of the dewatering extruder, where the dry polymer composition exits the dewatering extruder. The screw speed can be 150 to 1,200 revolutions per minute (rpm), specifically, 300 to 600 rpm, more specifically, 300 to 390 rpm.

The screw can have different cross-sections at different locations in the dewatering extruder. For example, the powder conveying section of the screw can have elements that are typified by screw elements having a wide pitch and which are forward flighted. The melt kneading section of the screw can include forward and reverse flighted kneading blocks. The melt conveying section of the screw can include forward flighted screw elements, reverse flighted screw elements, neutral screw elements, kneading blocks, dam rings, distributive mixing elements such as screw mixing elements (SMEs), turbine mixing elements (TMEs), and "zahnmisch" elements (ZMEs), or a combination comprising at least one of the foregoing. A last section of the screw in the melt conveying section can have a smaller pitch than the rest of screw in the melt conveying section. This smaller pitch can facilitate a pressure build up and is referred to herein as the pressure build-up zone. The smaller pitch can refer to a pitch that is at least 10% smaller than the pitch of the reference screw.

The dewatering extruder can be a co-rotating twin screw extruder and with the screws intermeshing with one another. Conversely, the twin screws can rotate in opposite directions.

The powder conveying section of the screw and the melt conveying section of the screw can each independently have two or more lobes. The powder conveying section of the screw can have two lobes. The melt conveying section of the screw can have two or three lobes, specifically, two lobes. FIGS. 4-6 are illustrations of cross-sections of intermeshing twin screws. FIG. 4 is an illustration of a cross-section of intermeshing two lobe screw 100; FIG. 5 is an illustration of a cross-section of intermeshing melt kneading screw 112; and FIG. 6 is an illustration of a cross-section of intermeshing tri lobe screw 114. The powder conveying section of the screw and the melt conveying section of the screw can comprise intermeshing two lobe screw 110 as illustrated in FIG. 4. The melt kneading section of the screw can comprise intermeshing melt kneading screw 112 as illustrated in FIG. 5. The melt conveying section of the screw can comprise intermeshing tri lobe twin screw 114 as illustrated in FIG. 6.

The dewatering extruder can comprise greater than or equal to 8 barrels, specifically, 8 to 15 barrels, more specifically, 4 to 11 barrels or 4 to 10 barrels. The powder conveying section can comprise greater than or equal to 6 barrels. The melt conveying section can comprise greater than or equal to 2 barrels, specifically, 3 to 4 barrels. The last barrels in the extruder, for example, the last 1 to 3 barrels in the melt conveying section can make up a pressure build-up zone.

The dewatering extruder can comprise a cooling device. The cooling device can operate to cool one or more barrels of the melt conveying section.

The dewatering extruder can comprise a condenser. The condenser can be used to quantify the amount of vapor that is removed from the dewatering extruder. A condenser can be located at one or more vent locations, for example, at one or more powder section vents and/or at one or more melt section vents. Specifically, a condenser can be located at all powder section vents. More specifically, a condenser can be located at all powder section vents and at all melt section vents. The condenser can be at atmospheric pressure or can be at a vacuum pressure, for example, with a vacuum pressure of less than or equal to 2,000 millibars absolute (mbara), more specifically, less than or equal to 1,000 mbara.

The powder conveying section comprises a polymer feed location. The polymer feed location can comprise a screw feeder stuffer, a crammer feeder, or a combination comprising at least one of the foregoing. The powder conveying section can comprise a gas feed location, for example, for a nitrogen feed comprising nitrogen. The gas feed location can be located downstream of the polymer feed location.

The powder conveying section comprises greater than or equal to one powder section vent, for example, 1 to 6 powder section vents. The powder conveying section can comprise greater than or equal to 2, specifically, greater than or equal to 3 or 2 to 6 powder section vents. When the powder conveying section comprises greater than or equal to 2 powder section vents, at least one of the powder section vents can be located upstream of the polymer feed location. For example, the powder conveying section can comprise greater than or equal to 3 melt section vents, wherein 1 melt section vent is located upstream of the polymer feed location and at least 2 venting locations are located downstream of the polymer feed location.

The powder conveying section can operate at a temperature of less than the melting temperature, $T_m$, of the polymer. The powder conveying section can operate at a temperature of less than or equal to 250 degrees Celsius (° C.). The temperature in successive barrels, for example, comparing the temperature of a second barrel located downstream of a first barrel in the powder conveying section can be the same or increased as compared to the first barrel. The temperature in the powder conveying section can increase from room temperature to below the melting temperature of the polymer, for example, from 23 to less than 250° C., specifically, 30 to 225° C. At least one of the barrels can operate at a temperature greater than the boiling point of the liquid component. For example, at least one of the barrels, specifically, 1 to 4 of the barrels in the powder conveying section can operate at a temperature of greater than or equal to 100° C., specifically, 100 to 200° C.

The powder section vent can have a vacuum pressure of less than or equal to 190 kilopascal (kPa), specifically, less than or equal to 120 kPa absolute. The powder conveying section can comprise greater than or equal to 2 powder section vents. For example, the powder conveying section can comprise 3 powder section vents, where the first powder section vent can have a vacuum pressure of 50 to 150 kPa absolute, the second powder section vent can have a vacuum pressure of 3 to 190 kPa absolute, and the third powder section vent can have a vacuum pressure of 0.1 to 3 kPa absolute.

The powder conveying section can comprise a powder seal section located such that powder exiting the powder seal section enters directly into the melt kneading section. The powder seal section can comprise a screw element, which retards the downstream progress of the powder sufficiently to create a powder seal but does not prevent the movement of the polymer powder across said powder seal. The powder seal section can comprise a packed polymer powder in a fully filled portion of the screw channel.

The melt kneading section is located downstream of the powder conveying section, for example, downstream of a powder seal section. In the melt kneading section, the polymer undergoes a phase transition from a solid powder to a melt. The melt kneading section can operate at a temperature of greater than or equal to the melting temperature of the polymer. For example, the temperature of the melt kneading section can be 250 to 300° C. The dewatering extruder can comprise one or more melt kneading sections, for example, at least two melt kneading sections. For example, the dewatering extruder can comprise a first melt kneading section located downstream of the powder conveying section, a second melt kneading section located upstream of the melt conveying section, and an intervening conveying section located in between the first melt kneading section and the second melt kneading section. The polymer composition in the intervening conveying section can be fully melted or partially melted.

The melt conveying section can have an additive feed location. For example, the melt conveying section can have greater than or equal to 1 additive feed location, for example, 1 to 3 additive feed locations.

The melt conveying section can have greater than or equal to 1, specifically, 1 to 4 melt section vents. The melt section vent can have a vacuum pressure of less than or equal to 120 kPa. For example, a vacuum can be applied at a melt section vent downstream of a melt seal section to facilitate removal of the liquid component.

The melt conveying section can comprise greater than or equal to one melt seal section, where a different melt seal section can be located upstream of each melt section vent. The melt seal section can comprise a reverse-flighted screw element or a dam ring. The melt seal section can comprise a reverse flighted conveying element, a dam ring, a kneading block, and a low shear element. The kneading block can comprise a forward kneading block, a neutral kneading block, a reverse kneading block, or a combination comprising at least one of the foregoing. The low shear element can be an element that imparts a lower shear to the polymer melt than that which would be imparted by a five disc kneading block, wherein the total length of the five disc kneading block is 50 to 100% of an inner diameter of an extruder barrel comprising the five disc kneading block. The low shear element can impart a lower shear to the polymer melt than that which is imparted by a melt-kneading block, where the melt-kneading block can have a total length that is greater than 100% of an inner diameter of an extruder barrel comprising the melt kneading block. The melt kneading block can have 5 or more discs.

The melt conveying section can comprise a pressure buildup zone at a distal end of the melt conveying section away from the powder conveying section. The melt conveying section can comprise a pressure buildup zone where the screw can be an intermeshing two lobe screw.

The melt conveying section can comprise a melt filter. The melt filter can be located before or after a pressure buildup zone.

The melt conveying section can operate at a temperature of greater than the melting temperature of the polymer. The melt conveying section can operate at a temperature of greater than or equal to 250° C., specifically, 250 to 450° C., more specifically, 250 to 400° C., even more specifically, 280 to 320° C.

The dewatering extruder can extrude the dry polymer composition in the form of pellets, strands, or the like. For example, the dewatering extruder can comprise a die with openings through which the dry polymer composition is extruded to form strands. A blade can be used to cut the strands into pellets. The openings of the extruder can be circular, ovoid, square shaped, rectangular, and the like.

The polymer can comprise a thermoplastic polymer. The polymer can include oligomers, polymers, ionomers, dendrimers, copolymers such as graft copolymers, block copolymers (e.g., star block copolymers, random copolymers, etc.), and combinations comprising at least one of the foregoing. The polymer can comprise a polycarbonate, a polystyrene, a polyphenylene ether, a polyimide (e.g., polyetherimide), a polybutadiene, a polyacrylonitrile, a poly($C_{1-12}$)alkylmethacrylate (e.g., polymethylmethacrylate (PMMA)), a polyester (e.g., polyethylene terephthalate, polybutylene terephthalate, polythioester), a polyolefin (e.g., polypropylene (PP), high density polyethylene (HDPE), low density polyethylene (LDPE), linear low density polyethylene (LLDPE)), a polyamide (e.g., polyamideimide), a polyarylate, a polysulfone (e.g., polyarylsulfone, polysulfonamide), a polyphenylene sulfide, a polyphenylene oxide, a polyethers (e.g., polyether ketone (PEK), polyether ether ketone (PEEK), polyethersulfone (PES)), a polyacrylic, a polyacetal, a polybenzoxazoles (e.g., polybenzothiazinophenothiazine, polybenzothiazole), a polyurea, a polyoxadiazole, a polypyrazinoquinoxaline, a polypyromellitimide, a polyquinoxaline, a polybenzimidazole, a polyoxindole, a polyoxoisoindoline (e.g., polydioxoisoindoline), a polytriazine, a polypyridazine, a polypiperazine, a polypyridine, a polypiperidine, a polytriazole, a polypyrazole, a polypyrrolidine, a polycarborane, a polyoxabicyclononane, a polydibenzofuran, a polyphthalide, a polyacetal, a polyanhydride, a polyvinyl (e.g., a polyvinyl ether, a polyvinyl thioether, a polyvinyl alcohol, a polyvinyl ketone, a polyvinyl halide (such as polyvinylchloride), a polyvinyl nitrile, a polyvinyl ester), a polysulfonate, a polysulfide, a polyphosphazene, a polysilazane, a polysiloxane, a fluoropolymer (e.g., polyvinyl fluoride (PVF), polyvinylidene fluoride (PVDF), fluorinated ethylene-propylene (FEP), polytetrafluoroethylene (PTFE), polyethylenetetrafluoroethylene (PETFE)), or a combination comprising at least one of the foregoing. The polymer can comprise a poly(ether ether ketone), a polyphenylene oxide, a polycarbonate, a polyester, an acrylonitrile-butadiene-styrene copolymer, styrene-butadiene copolymer, a styrene-ethylene-propylene copolymer, a nylon, or a combination comprising at least one of the foregoing. The polymer can comprise a liquid crystal polymer. The polymer can comprise an acrylonitrile-butadiene-styrene copolymer. The polymer can comprise a high temperature nylon. The polymer can comprise a combination comprising at least one of the foregoing polymers.

The polymer can comprise an interfacially polymerized polycarbonate. "Polycarbonate" as used herein means a polymer or copolymer having repeating structural carbonate units of the formula (1)

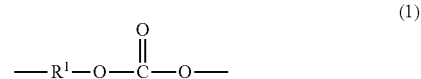

(1)

wherein at least 60 percent of the total number of $R^1$ groups are aromatic, or each $R^1$ contains at least one $C_{6-30}$ aromatic group. Polycarbonates and their methods of manufacture are known in the art, being described, for example, in WO 2013/175448 A1, US 2014/0295363, and WO 2014/072923. Polycarbonates are generally manufactured from bisphenol compounds such as 2,2-bis(4-hydroxyphenyl) propane ("bisphenol-A" or "BPA"), 3,3-bis(4-hydroxyphenyl) phthalimidine, 1,1-bis(4-hydroxy-3-methylphenyl)cyclohexane, or 1,1-bis(4-hydroxy-3-methylphenyl)-3,3,5-trimethylcyclohexane, or a combination comprising at least one of the foregoing bisphenol compounds can also be used. In a specific embodiment, the polycarbonate is a homopolymer derived from BPA; a copolymer derived from BPA and another bisphenol or dihydroxy aromatic compound such as resorcinol; or a copolymer derived from BPA and optionally another bisphenol or dihydroxyaromatic compound, and further comprising non-carbonate units, for example, aromatic ester units such as resorcinol terephthalate or isophthalate, aromatic-aliphatic ester units based on $C_{6-20}$ aliphatic diacids, polysiloxane units such as polydimethylsiloxane units, or a combination comprising at least one of the foregoing.

The polycarbonate can be made by an interfacial polymerization process. The interfacial polymerization can be a continuous process, a semi-batch process, or a batch process. Although the reaction conditions for interfacial polymerization can vary, an exemplary process generally involves dissolving or dispersing a dihydroxy compound in aqueous caustic soda or potash, adding the resulting mixture to a water immiscible solvent medium, and contacting the reactants with a carbonate compound in the presence of an interfacial catalyst (also referred to as a phase transfer catalyst) such as a tertiary amine, under controlled pH conditions, e.g., 8 to 10. The water immiscible solvent can comprise an aromatic chlorohydrocarbon and/or an aliphatic chlorohydrocarbon. The solvent can comprise methylene chloride, ethylene dichloride, 1,2-dichloroethane, 1,1,1-trichloroethane, 1,1,2-trichloroethane, chlorobenzene, carbon tetrachloride, toluene, benzene, xylene, anisole, or a combination comprising one or more of the foregoing. The solvent can comprise a low-boiling temperature solvent such as dichloromethane and a high-boiling temperature solvent such as chlorobenzene, for example, in a solvent ratio of 1:2 to 2:1. The aqueous phase can comprise tetrahydrofuran, 1,3/1,4-dioxane, 1,3-dioxolane, water, or a combination comprising one or more of the foregoing.

The carbonate compound can include a carbonyl halide such as carbonyl bromide or carbonyl chloride (phosgene) a bishaloformate of a dihydroxy compound (e.g., the bischloroformate of bisphenol A, hydroquinone ethylene glycol, neopentyl glycol, or the like), and diaryl carbonates. The carbonate compound can comprise phosgene. The carbonate compound can comprise a diaryl carbonate (such as an activated diaryl carbonate). Combinations comprising at least one of the foregoing types of carbonate compounds can also be used. The diaryl carbonate ester can be diphenyl carbonate, or an activated diphenyl carbonate having electron-withdrawing substituents on each aryl, such as bis(4-nitrophenyl)carbonate, bis(2-chlorophenyl)carbonate, bis(4-chlorophenyl)carbonate, bis(methyl salicyl)carbonate, bis(4-methylcarboxylphenyl) carbonate, bis(2-acetylphenyl) carboxylate, bis(4-acetylphenyl) carboxylate, or a combination comprising one or more of the foregoing. An interfacial polymerization reaction to form carbonate linkages can use phosgene as a carbonate compound, and is referred to as a phosgenation reaction.

The interfacial catalyst can comprise a tertiary amine. The tertiary amine can comprise an aliphatic tertiary amine (such as triethylamine and tributylamine), a cycloaliphatic tertiary amine (such as N,N-diethyl-cyclohexylamine), an aromatic tertiary amine (such as N,N-dimethylaniline), or a combination comprising one or more of the foregoing. Among the interfacial catalysts that can be used are catalysts of the formula $(R^3)_4Q^+X$, wherein each $R^3$ is the same or different, and is a $C_{1-10}$ alkyl group; Q is a nitrogen or phosphorus atom; and X is a halogen atom or a $C_{1-8}$ alkoxy group or a $C_{6-18}$ aryloxy group. Examples of phase transfer catalysts include $(CH_3(CH_2)_3)_4NX$, $(CH_3(CH_2)_3)_4PX$, $(CH_3(CH_2)_5)_4NX$, $(CH_3(CH_2)_6)_4NX$, $(CH_3(CH_2)_4)_4NX$, $CH_3(CH_3(CH_2)_3)_3NX$, and $CH_3(CH_3(CH_2)_2)_3NX$, wherein X is $Cl^-$, $Br^-$, a $C_{1-8}$ alkoxy group or a $C_{6-18}$ aryloxy group. An effective amount of a phase transfer catalyst can be 0.1 to 10 wt %, or 0.5 to 2 wt %, each based on the weight of bisphenol in the phosgenation mixture.

Branched polycarbonate blocks can be prepared by adding a branching agent during polymerization. These branching agents include polyfunctional organic compounds containing at least three functional groups selected from hydroxyl, carboxyl, carboxylic anhydride, haloformyl, and mixtures comprising one or more of the foregoing functional groups. The branching agents can comprise trimellitic acid, trimellitic anhydride, trimellitic trichloride, 1,1,1-tris(4-hydroxyphenyl)ethane, tris-p-hydroxy phenyl ethane, isatin-bisphenol, tris-phenol TC (1,3,5-tris((p-hydroxyphenyl)isopropyl)benzene), tris-phenol PA (4(4(1,1-bis(p-hydroxyphenyl)-ethyl) alpha, alpha-dimethyl benzyl) phenol), 4-chloroformyl phthalic anhydride, trimesic acid, and benzophenone tetracarboxylic acid. The branching agents can be added at a level of 0.05 to 2.0 wt % based on the total weight of the polycarbonate. Combinations comprising linear polycarbonates and branched polycarbonates can be used.

The content of the following branching structures can be less than or equal to 2,000 parts per million by weight (ppm), specifically, less than or equal to 1,000 ppm, more specifically, less than or equal to 900 ppm, even more specifically, less than or equal to 500 ppm.

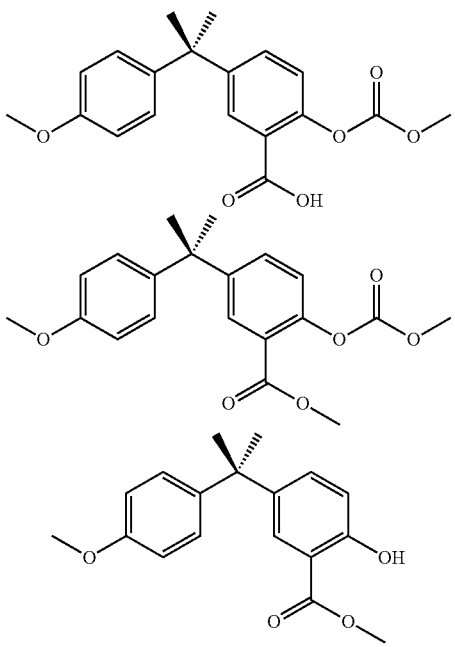

A branching agent can be employed in the polymerization and can result in an increase in polymer melt strength. The branching agent (for example, 1,1,1-tris-(hydroxyphenyl) ethane (THPE)) can be introduced to the polymerization unit as a solution of the branching agent dissolved in a branching solvent. The branching solvent selected for dissolving the branching agent can be any solvent capable of dissolving the branching agent at a level sufficient to deliver or introduce the desired amount of branching agent into the polymerization unit. The branching solvent can comprise lower alkanols, such as $C_{1-4}$ alkanols, including methanol, ethanol, propanol (such as n-propanol and isopropanol), n-butanol, or a combination comprising one or more of the foregoing.

The branching agent can be introduced in an amount such that it will result in a polycarbonate comprising up to 1.5 mole percent (mol %), specifically, up to 1.0 mol %, more specifically, up to 0.5 mol % branching agent in the final branched polycarbonate. The amount of dissolved branching agent present in the solution can be an amount of 0.5 to 50 wt %, specifically, 5 to 40 wt %, more specifically, 15 to 35 wt % relative to the total weight of the branching agent and solvent solution. The polycarbonate can comprise a branching agent in the amount of 100 to 5,000 ppm, specifically, 500 to 4,000 ppm, more specifically, 1,000 to 3,500 ppm based on the total amount of polycarbonate repeat units.

All types of polycarbonate end groups are contemplated as being useful in the polycarbonate composition, provided that such end groups do not significantly adversely affect desired properties of the compositions. A chain stopper (also referred to as an end capping agent) can be included during polymerization. The chain stopper limits molecular weight growth rate, and so controls molecular weight in the polycarbonate. Examples of chain stoppers include certain mono-phenolic compounds, mono-carboxylic acid chlorides, and/or mono-chloroformates. Mono-phenolic chain stoppers are exemplified by monocyclic phenols such as phenol and $C_{1-22}$ alkyl-substituted phenols such as p-cumylphenol, resorcinol monobenzoate, and p- and tertiary-butyl phenol; and monoethers of diphenols, such as p-methoxyphenol. Alkyl-substituted phenols with branched chain alkyl substituents having 8 to 9 carbon atoms can be specifically mentioned. Certain mono-phenolic UV absorbers can also be used as a capping agent, for example, 4-substituted-2-hydroxybenzophenones and their derivatives, aryl salicylates, monoesters of diphenols such as resorcinol monobenzoate, 2-(2-hydroxyaryl)-benzotriazoles and their derivatives, 2-(2-hydroxyaryl)-1,3,5-triazines and their derivatives, and the like. Mono-carboxylic acid chlorides can also be used as chain stoppers. These include monocyclic, mono-carboxylic acid chlorides such as benzoyl chloride, $C_{1-22}$ alkyl-substituted benzoyl chloride, toluoyl chloride, halogen-substituted benzoyl chloride, bromobenzoyl chloride, cinnamoyl chloride, 4-nadimidobenzoyl chloride, and combinations thereof; polycyclic, mono-carboxylic acid chlorides such as trimellitic anhydride chloride, and naphthoyl chloride; and combinations of monocyclic and polycyclic mono-carboxylic acid chlorides. Chlorides of aliphatic monocarboxylic acids with less than or equal to 22 carbon atoms are useful. Functionalized chlorides of aliphatic monocarboxylic acids, such as acryloyl chloride and methacryoyl chloride, are also useful. Also useful are monochloroformates including monocyclic, mono-chloroformates, such as phenyl chloroformate, alkyl-substituted phenyl chloroformate, p-cumyl phenyl chloroformate, toluene chloroformate, and combinations thereof.

The polymerization can comprise a branching agent comprising 1,1,1-tris(4-hydroxyphenyl)ethane or a combination of trimellitic trichloride and 1,1,1-tris(4-hydroxyphenyl)ethane. The polymerization can comprise a chain stopper comprising phenol or a phenol containing a substituent of cyano group, aliphatic groups, olefinic groups, aromatic groups, halogens, ester groups, ether groups, or a combination comprising at least one of the foregoing. The chain stopper can comprise phenol, p-t-butylphenol, p-methoxyphenol, p-cyanophenol, p-cumylphenol, or a combination comprising at least one of the foregoing.

The polycarbonate can be a branched polycarbonate comprising units as described above; greater than or equal to 3 mole percent (mol %), based on the total moles of the polycarbonate, of moieties derived from a branching agent; and end-capping groups derived from an end-capping agent having a pKa of 8.3 to 11.

In general, polymerization of polycarbonate utilizes a polymerization unit that can comprise a continuously stirred tank reactor(s) (CSTR), a tubular reactor(s), a centrifuge(s) (such as a disc-type centrifuge and a CINC™ centrifuge), a heat exchanger(s), a decanter(s), a separating coalescer(s), an extraction column(s), a devolatilizer(s), an extruder(s), a scrubber(s), a filter(s), or combinations comprising one or more of the foregoing. For example, the polymerization unit can comprise one or more reactors, for example, one or more CSTRs and/or one or more tubular reactors that can each independently act as a polymerization vessel. The reactor(s) can be operated in a batch mode, a semi-batch mode, or a continuous mode.

The interfacial polycarbonate can have a weight average molecular weight of 18,000 to 40,000 Daltons, specifically, 18,000 to 35,000 Daltons, measured by gel permeation chromatography using polycarbonate standards. The polycarbonate powder (wet or dry) can have a bulk density of 130 to 220 kilograms per meter cubed ($kg/m^3$). The polycarbonate in pellet form can have a bulk density of greater than or equal to 550 $kg/m^3$. Unless otherwise stated, bulk density was determined in accordance with ISO 697:1981. The interfacial polycarbonate can comprise less than or equal to 10 mg of sulfur per kilogram of the dry polycarbonate.

An article molded from the dry interfacial polycarbonate and having a thickness of 2.5 mm can have one or more of a light transmission of greater than or equal to 85% as measured by ASTM D1003-07, a haze of less than or equal to 1, and a yellowness index less than or equal to 2 as measured by ASTM D1925.

An additive can be added to one or both of the powder conveying section and the melt conveying section. Specifically, an additive can be added to the powder conveying section, for example, after the wet polymer is dried, such that the polymer comprises less than or equal to 5 wt %, specifically, less than or equal to 3 wt % of a liquid component. The additive can be added through a side feeder. The additive can be added in the form of a liquid. The liquid additive can be added using a liquid injector. The additive can be added in an inert atmosphere (wherein the inert atmosphere means that the atmosphere does not react with the polycarbonate or the additive), for example, under nitrogen.

The additive can comprise an impact modifier, flow modifier, filler (e.g., a particulate polytetrafluoroethylene (PTFE), glass, carbon, mineral, or metal), reinforcing agent (e.g., glass fibers), antioxidant, heat stabilizer, light stabilizer, ultraviolet (UV) light stabilizer, UV absorbing additive, plasticizer, lubricant, release agent (such as a mold release agent), antistatic agent, anti-fog agent, antimicrobial agent, colorant (e.g., a dye or pigment), surface effect additive, radiation stabilizer, flame retardant, anti-drip agent (e.g., a PTFE-encapsulated styrene-acrylonitrile copolymer (TSAN)), or a combination comprising at least one of the foregoing. For example, the additive can comprise a heat stabilizer, a mold release agent, an ultraviolet light stabilizer, or a combination comprising at least one of the foregoing. The additive can comprise a heat stabilizer, an oxygen scavenger, a mold release agent, an ultraviolet light stabilizer, a colorant (such as a pigment or a dye), or a combination comprising at least one of the foregoing. The additive can comprise an ultraviolet light stabilizer, a thermal stabilizer, a mold release agent, a colorant, a filler (such as one or both of an organic filler and an inorganic filler), a gamma-stabilizing agent, or a combination comprising at least one of the foregoing.

The additive can comprise two or more additives (other than any impact modifier, filler, or reinforcing agent), wherein each additive independently can be 0.001 to 10.0 wt %, or 0.01 to 5 wt %, each based on the total weight of the polymer in the composition. The additive can be added such that the polymer composition comprises 0.01 to 1 wt %, specifically, 0.1 to 0.6 wt % of a heat stabilizer such as tris(2,4-di-tert-butylphenyl) phosphite available as IRGAFOS™ 168 based on the total weight of the polymer composition. The additive can be added such that the polymer composition comprises 0.01 to 1 wt %, specifically, 0.05 to 0.5 wt % of a heat stabilizer such as (octadecyl-3-(3,5-di-tert.butyl-4-hydroxyphenyl)-propionate). The additive can be added such that the polymer composition comprises 0.01 to 1 wt %, specifically, 0.1 to 0.6 wt % of a release agent such as pentaerythritol tetrastearate, stearyl stearate, glycerol monostearate, glycerol tristearate, or a combination comprising one or more of the foregoing. The release agent can comprise pentaerythritol tetrastearate. The release agent can comprise glycerol tristearate. The additive can be added such that the polymer composition comprises 0.01 to 1 wt %, specifically, 0.1 to 0.6 wt % of a UV stabilizer such as 2-(2-Hydroxy-5-tert-octylphenyl) benzotriazole. The additive can be added such that the polymer composition comprises 0 to 1 wt %, specifically, 0.01 to 0.4 wt % of a colorant. For example, the additive can be added such that the polymer composition comprises 0 to 1 wt %, specifically, 0.01 to 1 wt %, more specifically, 0.05 to 0.4 wt % of a pigment such as ultramarine blue.

An article can be formed from the dry polymer composition. For example, the article can be formed by molding (such as extrusion molding, blow molding, vacuum molding, and the like). The article can be a lens. For example, the article can be an automotive lens (such as a headlamp, a tail lamp, a dome lamp, and the like). The article can be a consumer electronic screen, for example, a screen for use in a mobile phone, a laptop, a desktop, a tablet, a smart watch, or a television.

EXAMPLES

Haze and transmission were measured according to ASTM D 1003-07 in a 2.5 millimeter (mm) plaque and according to Procedure A using a Hazemeter without specular mode and using Illuminant D65.

Color was determined in accordance with the CIELAB method (Comission Inetrnationale de l'Eclairage 1 9 7 6 L *a*bDiagram) to evaluate the L value, the a value, and the b* value.

Yellowness index was measured according ASTM D1925-88 on a 2.5 mm thickness plaque.

Melt volume flow rate (MVR) was measured at 300 degrees Celsius (° C.), under a load of 1.2 kilogram (kg) according to ASTM D1238-04 or ISO 1133. The units are in centimeters cubed per 10 minutes ($cm^3/10$ min).

The sulfur level in the resultant composition (pellets or molded article) was determined by a commercially available Total Sulfur Analysis based on combustion and coulometric detection.

The weight average molecular weight (Mw) and the number average molecular weight (Mn) were measured by gel permeation chromatography using polycarbonate standards.

The extruders used in the examples are illustrated in FIGS. 1 and 2, where the dotted lines illustrating additional plates for liquid injection were not used; the up arrows illustrate venting locations, and the down arrows illustrate feeding locations.

The compounding extruder of the below examples was a compounding extruder as illustrated in FIG. 1. The compounding extruder had an inner diameter of 25 mm and a length of 30 diameters. The compounding extruder was divided into four heating zones at temperatures where the temperature profile was: section 2, 40° C.; section 4, 200° C.; section 6, 250° C., and sections 8-14, 300° C. The up arrow denotes a single vent port in the extruder.

The dewatering extruder of the below examples was a co-rotating intermeshing, 11 barrel, twin screw dewatering extruder possessing a single feed throat and with a 26 mm inner diameter. The dewatering extruder is illustrated in FIG. 2. The temperature profile used was: section 30, 50° C.; section 32, 70° C.; section 34, 120° C.; section 36, 190° C.; section 38, 200° C.; section 40, 200° C.; section 42, 250° C.; and sections 44-50, 300° C. Section 20 is the powder conveying section, section 22 is the melt kneading section, and section 24 is the melt conveying section. The dewatering extruder had one venting location in the powder conveying section and one venting location in the melt conveying section. The dewatering extruder had a side feeder at barrel 40 as an additional venting location in the powder conveying section and a vent port was located in the melt conveying section. The dewatering extruder had a length to diameter ratio of 44:1 and a diameter of 26 mm.

Molded plaques with a thickness of 2.5 mm were prepared by first drying the extruded polycarbonate at 121° C. for 4 hours. The dried polycarbonate was then injected into a mold at an injection speed of 30 millimeters per second (mm/s). The injection molding machine applied 110 tons of force and operated at 280 to 300° C. The cooling time was 15 seconds.

Examples 1-8: Polycarbonate Extrusion in the Compounding and Dewatering Extruders The interfacial polycarbonates of Examples 1-8 were extruded according to Table 1, where Examples 1 and 5-7 were dry interfacial polycarbonates with water concentrations of less than 1 wt %, and Examples 2, 3, 4, and 8 were wet polycarbonates. In the table, C denotes the compounding extruder and D denotes the dewatering extruder. The venting port in the powder conveying section of Example 4 was closed.

The interfacial polycarbonates of Examples 6-8 were extruded with an additives package such that the extruded composition comprised 98.67 wt % of the polycarbonate; 0.4 wt % of heat stabilizer 1 (tris(2,4-ditert-butylphenyl) phosphite); 0.2 wt % of heat stabilizer 2 (octadecyl-3-(3,5-di-tert.butyl-4-hydroxyphenyl)-propionate); 0.3 wt % of release agent (pentaerythritol tetrastearate); 0.3 wt % of a UV stabilizer (2-(2-Hydroxy-5-tert-octylphenyl) benzotriazole); and 0.13 wt % of a pigment (ultramarine blue).

TABLE 1

| Example | 1 | 2 | 3 | 4 | 5 | 6 | 7 | 8 |
|---|---|---|---|---|---|---|---|---|
| Water (wt %) | <1 | 12 | 13.4 | 13.4 | <1 | <1 | <1 | 12.2 |
| Additives | N | N | N | N | N | Y | Y | Y |
| Extruder | C | C | C | D | D | C | D | D |
| Extrusion conditions | | | | | | | | |
| Screw speed (rpm) | 300 | 300 | 300 | 300 | 300 | 300 | 300 | 300 |
| Throughput (kg/h) | 8 | 8 | 20 | 20 | 20 | 20 | 20 | 20 |
| Torque (%) | N/A | N/A | 60 | 63 | 49 | 57 | 50 | 55 |
| Barrel temperature (° C.) | 300 | 300 | 300 | 300 | 300 | 300 | 300 | 300 |
| Pellet analysis | | | | | | | | |
| Ionic chlorides (*mg/kg) | 0.46 | 1.57 | 0.93 | 0.98 | 0.69 | 0.56 | 0.48 | 0.59 |
| Water (*mg/kg) | 206 | 196 | 200 | 248 | 264 | 190 | 210 | 166 |
| Mw (kiloDaltons) | 30.1 | 28.4 | 29.1 | 29.0 | 29.6 | 29.7 | 29.5 | 29.7 |
| PDI | 2.65 | 2.58 | 2.57 | 2.56 | 2.58 | 2.58 | 2.50 | 2.57 |
| MVR (cm$^3$/10 min) | — | — | 7.4 | 13.2 | 6.1 | 7.75 | 8.54 | 8.91 |
| Sulfur (*mg/kg) | 5.4 | 4.8 | 8.2 | 7.9 | 9.5 | 3.3 | 2.3 | 2.5 |
| Molded article | | | | | | | | |
| Yellowness index | 1.8 | 2.1 | 2.1 | 2.4 | 3.3 | 1.57 | 1.42 | 1.76 |
| Haze | — | — | — | — | — | 0.48 | 0.52 | 0.51 |
| Transmission (%) | — | — | — | — | — | 90.2 | 90.0 | 89.7 |

*as used herein mg/kg refers to milligrams of the component per kilogram of composition Table 1 shows that polycarbonates extruded in the dewatering extruder surprisingly resulted in an extruded polycarbonate with similar properties as the dried, extruded polycarbonate, for example, considering the PDI, molecular weight, haze, and transmission. Example 7 further shows that using a dewatering extruder, the extruded polycarbonate had the low yellowness index of only 1.42.

Figure 7:
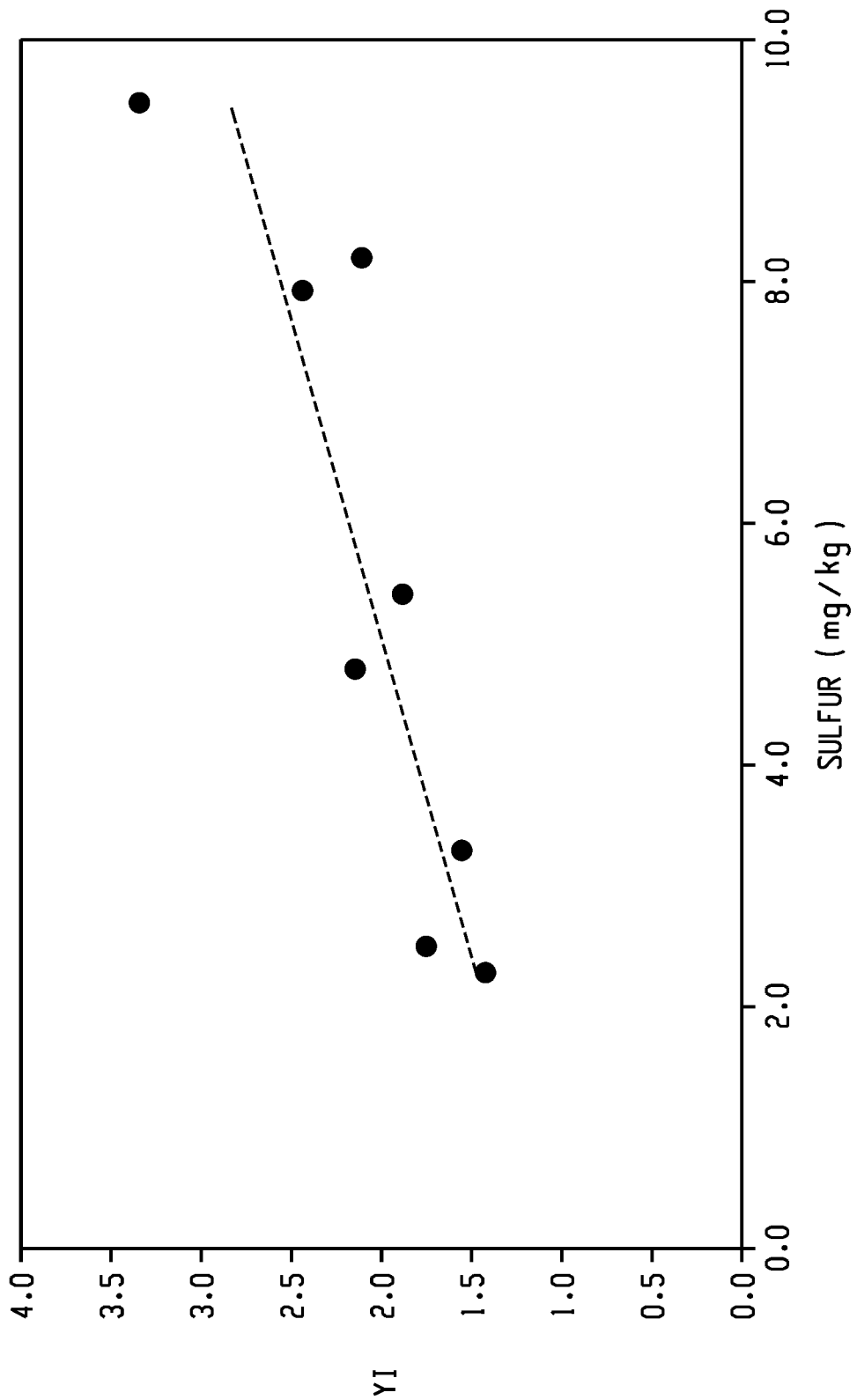
FIG. 7 is a graphical illustration of the yellowness index versus sulfur concentration of the Examples.

The yellowness index as a function of sulfur concentration was plotted and is shown in FIG. 7. FIG. 7 illustrates the surprising result that a low-sulfur polycarbonate surprisingly results in an improved yellowness index, where FIG. 7 illustrates that over a sulfur concentration 2 to 9 milligrams of sulfur per kilogram of the extruded composition there is a correlation between the YI versus the amount of sulfur.

Prophetic Example 9

Figure 8:
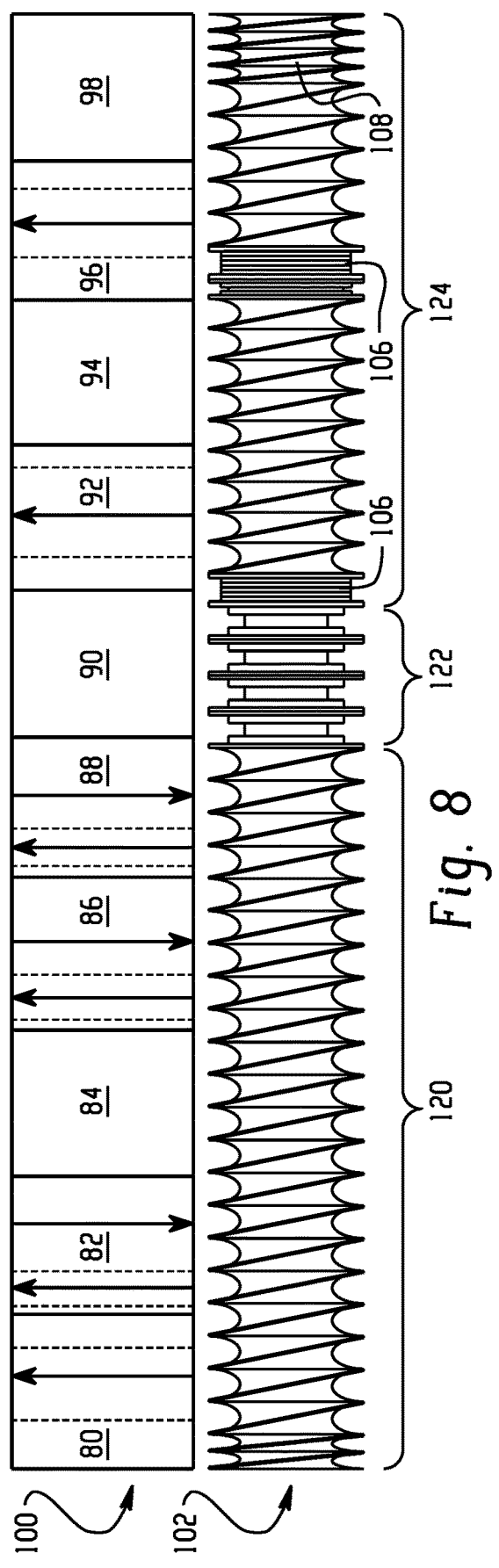
FIG. 8 is an illustration of an embodiment of a dewatering extruder of Examples 9 and 10.

The dewatering extruder of FIG. 8 is used to dry and compound a wet interfacial polycarbonate powder with a water concentration of 6 to 8 wt %. The interfacial polycarbonate had a weight average molecular weight of 30,000 Daltons based on polycarbonate standards and a phenol endcap and/or a p-cumylphenol endcap. The dewatering extruder has two melt seal sections: one upstream of the vent in barrel 92 and after the melt kneading section, and the other in barrel 94 upstream of the vent in barrel 96. The dewatering extruder has a powder seal section just before the melt kneading section such that the polycarbonate exiting the powder seal section directly enters the melt kneading section. The dewatering extruder has a pressure build up zone in barrel 98. The screw in the powder conveying section and in the melt conveying section is an intermeshing two lobe twin screw. The dewatering extruder has a length to diameter ratio of 40 and a diameter of 50 mm.

The dewatering extruder will operate at a screw speed of 150 to 450 rpm. The temperature of the barrels in the powder conveying section will operate at a temperature of less than 250° C. and the melt conveying section will operate at a temperature of 300° C.

The wet polycarbonate is fed into barrel 82 and an additive package comprising 0.05% of a heat stabilizer is added in barrel 88. The vents in barrels 80, 82, 86, 88, 92, and 96 are open.

Prophetic Example 10

The dewatering extruder of Example 9 is used except that the polycarbonate is added in barrel 86 and not in barrel 82.

Prophetic Example 11

Figure 9:
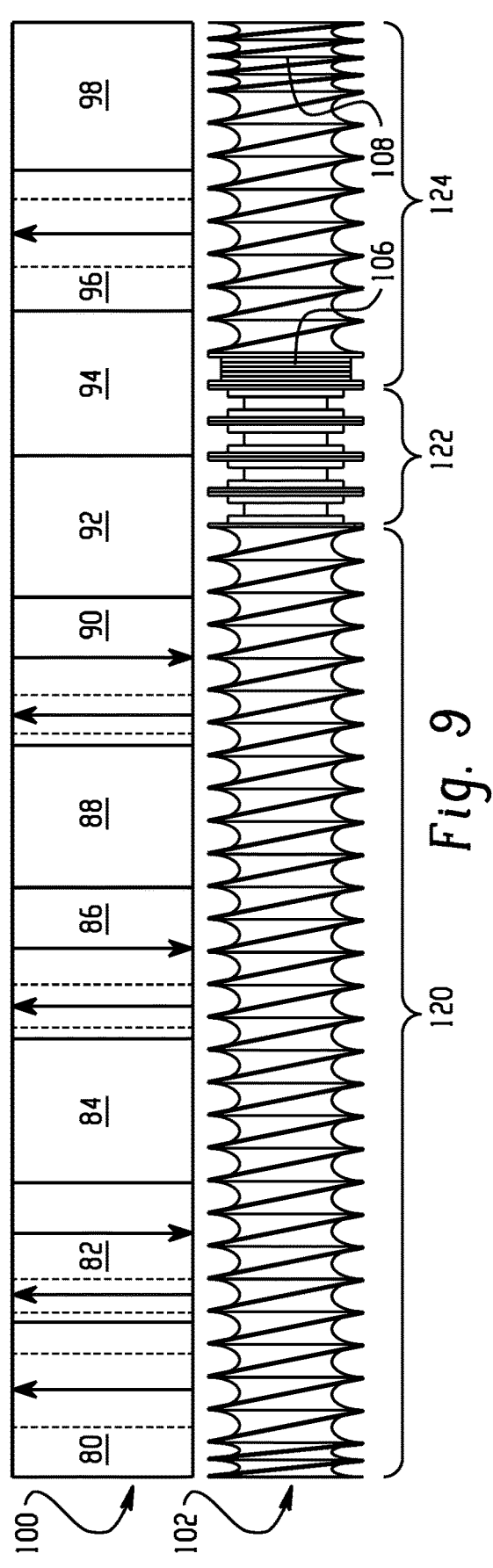
FIG. 9 is an illustration of an embodiment of a dewatering extruder of Examples 11 and 12.

The dewatering extruder of FIG. 9 is used to dry and compound a wet interfacial polycarbonate powder with a water concentration of 10 to 12 wt %. The interfacial polycarbonate had a weight average molecular weight of 30,000 Daltons based on polycarbonate standards and a phenol endcap. The dewatering extruder has one melt seal section that is located upstream of the vent in barrel 96 and after the melt kneading section. The dewatering extruder has a powder seal section just before the melt kneading section such that the polycarbonate exiting the powder seal section directly enters the melt kneading section. The dewatering extruder has a pressure build up zone in barrel 98. The screw in the powder conveying section and in the melt conveying section is an intermeshing two lobe twin screw. The dewatering extruder has a length to diameter ratio of 40 and a diameter of 50 mm.

The dewatering extruder will operate at a screw speed of 150 to 450 rpm. The temperature of the barrels in the powder conveying section will operate at a temperature of less than 250° C. and the melt conveying section will operate at a temperature of 300° C.

The wet polycarbonate is fed into barrel 82 and an additive package comprising 0.05% of a heat stabilizer is added in barrel 90. The vents in barrels 80, 82, 86, 90, and 96 are open.

Prophetic Example 12

The dewatering extruder of Example 11 is used except that the polycarbonate is added in barrel 86 and not in barrel 82.

Example 13-17: Dewatering of Interfacial Polycarbonate

Wet interfacial polycarbonates of Examples 13-17 were extruded using the extrusion conditions according to Table 2. Extruder configuration I comprised 10 barrels with top vents located in barrels 1 and 9, a melt kneading block located in barrel 6, side degassers located in barrels 4 and 7, and a feeding location in barrel 2. Extruder configuration II comprised 11 barrels with top vents located in barrels 1 and 9, melt kneading blocks located in barrels 4 and 6, a slit barrel degasser in barrel 3, side degassers in barrels 5 and 7, and a feeding location in barrel 2. Extruder configuration III comprised 11 barrels with a top vent located at barrel 10, a degasser at barrel 6 (which was open for Example 16 and closed for Example 17), and a feeding location in barrel 2.

TABLE 2

| Example | 13 | 14 | 15 | 16 | 17 |
|---|---|---|---|---|---|
| Extruder Configuration | I | I | II | III | III |
| Screw size (mm) | 50 | 50 | 58 | 26 | 26 |
| RPM | 300 | 300 | 300 | 300 | 300 |
| Feedrate (kg/hr) | 200 | 200 | 300 | 20 | 20 |
| Water content (wt %) | 6 | 12 | 12 | 12 | 12 |
| Mw feed (g/mol) | 30,225 | 29,994 | 30,000 | 29,800 | 29,800 |
| Mn feed (g/mol) | 11,565 | 11,514 | 11,800 | 11,656 | 11,656 |
| Mw Pellet (g/mol) | 29,664 | 29,998 | 29,700 | 29,029 | 28,809 |
| Mn Pellet (g/mol) | 11,409 | 11,555 | 12,000 | 11,307 | 11,218 |
| MVR | 6.60 | 5.18 | 9.20 | 7.40 | 13.20 |
| YI | 1.53 | 1.91 | 2.37 | 2.11 | 2.44 |
| Transmission (%) | 90.76 | 90.50 | 90.50 | 90.8 | 90.4 |
| Haze (%) | 0.34 | 0.40 | 0.83 | 0.53 | 0.58 |
| L | 95.63 | 95.48 | 95.51 | 95.58 | 95.47 |
| a | −0.07 | −0.09 | −0.09 | −0.08 | −0.09 |
| b* | 0.74 | 0.95 | 1.21 | 1.05 | 1.23 |

Table 2 illustrates that all of Examples 13-17 had a change in the molecular weight of less than 5%, specifically, of less than 3% and that Examples 13-15 had a change in the molecular weight of less than 2%. Table 2 further illustrates that all of Examples 13-17 had a YI of less than 3 and that Examples 13-14 had YI values of less than 2.

The above described method of dewatering a polymer is further described in the below embodiments.

Embodiment 1

A method of dewatering a wet polymer composition comprises introducing the wet polymer composition via a polymer feed location to a powder conveying section of an extruder; wherein the wet polymer composition comprises greater than or equal to 1 wt % of water based on the total weight of the wet polymer composition; venting the water through a conveying section vent to form a dry polymer composition; adding an additive; wherein the adding comprises adding an optionally liquid additive composition comprising the additive in the powder conveying section to the dry polymer composition; melt kneading the dry polymer composition in a melt kneading section of the extruder to form a polymer melt; and conveying the polymer melt in a melt conveying section of the extruder.

Embodiment 2

The method of Embodiment 1, wherein the adding is performed under nitrogen.

Embodiment 3

A method of dewatering a wet polymer composition comprising introducing the wet polymer composition via a polymer feed location to a powder conveying section of an extruder; wherein the wet polymer composition comprises greater than or equal to 1 wt % of water based on the total weight of the wet polymer composition; venting the water through a conveying section vent to form a dry polymer composition; melt kneading the dry polymer composition in a melt kneading section of the extruder to form a polymer melt, wherein the melt kneading section comprises a melt kneading block; and conveying the polymer melt in a melt conveying section of the extruder; wherein the conveying introduces a shear to the polymer melt; introducing the polymer melt to a melt seal section located in the melt conveying section; wherein the melt seal comprises a reverse flighted conveying element, a dam ring, a kneading block, and a low shear element; wherein the kneading block comprises a forward kneading block, a neutral kneading block, a reverse kneading block, or a combination comprising at least one of the foregoing; wherein the low shear element imparts a lower shear to the polymer melt than that which is imparted by the melt-kneading block and/or wherein the low shear element imparts a lower shear to the polymer melt than that which would be imparted by a five disc with a total length of 50 to 100% of an inner diameter of an extruder barrel comprising the five disc kneading block; venting the polymer melt in the melt conveying section downstream of the melt seal section; and optionally adding an additive.

Embodiment 4

The method of Embodiment 3, wherein the low-shear element comprises a screw mixing element, a turbine mixing element, a zahnmisch element, or a combination comprising at least one of the foregoing.

Embodiment 5

The method of any one of the preceding embodiments, wherein the additive comprises 0.01 to 1 wt % of a heat stabilizer, 0.01 to 1 wt % of a release agent, 0.01 to 1 wt % of a UV stabilizer, 0 to 1 wt %, specifically, 0.1 to 1 wt % of a colorant, or a combination comprising at least one of the foregoing, all based on the total weight of the polymer and additive.

Embodiment 6

A method of dewatering a wet polymer composition comprising introducing the wet polymer composition via a polymer feed location to a powder conveying section of an extruder; wherein the wet polymer composition comprises greater than or equal to 1 wt % of water based on the total weight of the wet polymer composition; venting the water through a conveying section vent to form a dry polymer composition; melt kneading the dry polymer composition in a melt kneading section of the extruder to form a polymer melt; conveying the polymer melt in a melt conveying section of the extruder; and adding an additive in one or both of the powder conveying section and the melt conveying section, wherein the additive comprises 0.01 to 1 wt % of a heat stabilizer, 0.01 to 1 wt % of a release agent, 0.01 to 1 wt % of a UV stabilizer, 0 to 1 wt %, specifically, 0.1 to 1 wt % of a colorant, or a combination comprising at least one of the foregoing, all based on the total weight of the polymer and additive.

Embodiment 7

The method of any one of Embodiments 3-6, further comprising adding the additive in the form of a liquid in the powder conveying section to the dry polymer composition, wherein the additive is optionally added under nitrogen.

Embodiment 8

The method of any one of Embodiments 1, 2, or 5-7, wherein the melt kneading section comprises a melt kneading block; and the method further comprises introducing the polymer melt to a melt seal section located in the melt conveying section; wherein the melt seal comprises a reverse flighted conveying element, a dam ring, a kneading block, and a low shear element; wherein the kneading block comprises a forward kneading block, a neutral kneading block, a reverse kneading block, or a combination comprising at least one of the foregoing; wherein the low shear element imparts a lower shear to the polymer melt than that which is imparted by the melt-kneading block and/or wherein the low shear element imparts a lower shear to the polymer melt than that which would be imparted by a five disc with a total length of 50 to 100% of an inner diameter of an extruder barrel comprising the five disc kneading block.

Embodiment 9

The method of any one of the preceding embodiments, wherein the conveying comprises conveying the polymer melt using a two lobe mixing element.

Embodiment 10

The method of any one of the preceding embodiments, further comprising melt filtering the polymer melt in the melt conveying section.

Embodiment 11

The method of any one of the preceding embodiments, wherein the dewatering extruder has a length to inner diameter ratio of greater than 40.

Embodiment 12

The method of any one of Embodiments 1-11, wherein the dewatering extruder has a length to inner diameter ratio of 40 or less.

Embodiment 13

The method of any one of the preceding embodiments, wherein the diameter is greater than or equal to 40 mm, specifically, 40 to 450 mm.

Embodiment 14

The method of any one of the preceding embodiments, introducing a low shear to the polymer melt in a melt seal section located in the melt conveying section via a low-shear element.

Embodiment 15

The method of any one of the preceding embodiments, wherein the dewatering extruder comprises two or more melt section vents, wherein a melt seal section is located upstream of each melt section vent.

Embodiment 16

The method of any one of the preceding embodiments, wherein the dry polymer composition comprises less than or equal to 0.4 wt % of water.

Embodiment 17

The method of any one of the preceding embodiments, wherein the wet polymer composition comprises greater than or equal to 5 wt %, specifically, 10 to 40 wt % of water.

Embodiment 18

The method of any one of the preceding embodiments, wherein the adding comprises adding the additive in the melt conveying section.

Embodiment 19

The method of any one of the preceding embodiments, comprising adding the additive in the melt conveying section in two or more additive feeding locations.

Embodiment 20

The method of any one of the preceding embodiments, comprising adding the additive in the powder conveying section via a liquid injector.

Embodiment 21

The method of any one of the preceding embodiments, comprising adding the additive in the powder conveying section in two or more additive feed locations.

Embodiment 22

The method of any one of the preceding embodiments, wherein the additive comprises tris(2,4-di-tert-butylphenyl) phosphite, octadecyl-3-(3,5-di-tert.butyl-4-hydroxyphenyl)-propionate, pentaerythritol tetrastearate, stearyl stearate, glycerol monostearate, glycerol tristearate, 2-(2-Hydroxy-5-tert-octylphenyl) benzotriazole, ultramarine blue, or a combination comprising at least one of the foregoing, specifically, the additive can comprise tris(2,4-di-tert-butylphenyl) phosphite.

Embodiment 23

The method of any one of the preceding embodiments, wherein the venting in one or both of the powder conveying section and the melt conveying section occurs at a vacuum pressure of less than or equal to 120 kPa.

Embodiment 24

The method of any one of the preceding embodiments, wherein the powder conveying section comprises two or more powder section vents, and wherein at least one of the powder section vents is located upstream of the polymer feed location.

Embodiment 25

The method of any one of the preceding embodiments, comprising venting in the powder conveying section in 1 to 6 powder section vents.

Embodiment 26

The method of any one of the preceding embodiments, comprising venting in the powder conveying section in greater than or equal to 3 melt section vents, wherein at least 1 melt section vent is located upstream of the polymer feed location and at least 2 venting locations are located downstream of the polymer feed location.

Embodiment 27

The method of any one of the preceding embodiments, wherein the extruder is an intermeshing, co-rotating twin screw extruder.

Embodiment 28

The method of Embodiment 27, wherein the twin screw in the powder conveying section is a two lobe intermeshing screw, and the twin screw in the melt conveying section is a two or tri lobe intermeshing screw, specifically, a two lobe intermeshing screw.

Embodiment 29

The method of any one of the preceding embodiments, wherein the wet polymer composition comprises less than or equal to 5 wt % of halogenated solvent based on the total weight of the wet polymer composition.

Embodiment 30

The method of any one of the preceding embodiments, wherein the dry polymer composition comprises less than or equal to 500 ppm water based on the total weight of the dry polymer composition and less than or equal to 1 ppm of a residual halogenated solvent based on the total weight of the dry polymer composition.

Embodiment 31

The method of any one of the preceding embodiments, wherein the dewatering extruder comprises greater than or equal to 8 barrels.

Embodiment 32

The method of any one of the preceding embodiments, wherein the powder conveying section comprises greater than or equal to 6 barrels.

Embodiment 33

The method of any one of the preceding embodiments, wherein the dewatering extruder comprises less than or equal to 15 barrels.

Embodiment 34

The method of any one of the preceding embodiments, wherein the dewatering extruder comprises 4 to 11 barrels, specifically, 4 to 10 barrels.

Embodiment 35

The method of any one of the preceding embodiments, wherein the powder conveying section has a temperature of less than or equal to 250° C.

Embodiment 36

The method of any one of the preceding embodiments, wherein the melt conveying section comprises greater than or equal to 2 barrels, specifically, 3 to 4 barrels.

Embodiment 37

The method of any one of the preceding embodiments, wherein the conveying occurs at a temperature of greater than 250° C.

Embodiment 38

The method of any one of the preceding embodiments, wherein the wet polymer composition comprises a wet interfacial polycarbonate and the dry polymer composition comprises a dry interfacial polycarbonate.

Embodiment 39

The method of Embodiment 39, wherein the wet interfacial polycarbonate and the dry interfacial polycarbonate have a weight average molecular weight of 18,000 to 40,000 Daltons, measured by gel permeation chromatography using polycarbonate standards.

Embodiment 40

The method of any one of Embodiments 38-39, wherein the wet interfacial polycarbonate in the form of a wet powder or the dry interfacial polycarbonate in the form of a dry powder has a bulk density of 130 to 220 kg/m$^3$ and/or wherein the dry polymer composition in pellet form comprises the dry interfacial polycarbonate, wherein the dry interfacial polycarbonate has a bulk density of greater than or equal to 550 kg/m$^3$.

Embodiment 41

The method of any one of Embodiments 38-40, wherein the dry polymer composition comprises less than or equal to 10 mg of sulfur per kilogram of the dry interfacial polycarbonate.

Embodiment 42

The method of any one of Embodiments 38-41, wherein an article molded from the dry interfacial polycarbonate and having a thickness of 2.5 mm has one or more of a transmission of greater than or equal to 85%, or greater than or equal to 90% as measured by ASTM D1003-07, a haze of less than or equal to 1% as measured by ASTM D1003-07; and a yellowness index less than or equal to 3, or less than or equal to 2 as measured by ASTM D1925.

Embodiment 43

The method of any one of the preceding embodiments, wherein the melt conveying section comprises a pressure buildup zone at a distal end of the melt conveying section away from the powder conveying section.

Embodiment 44

The method of any one of the preceding embodiments, wherein the melt conveying section comprises a pressure buildup zone with two lobe elements.

Embodiment 45

The method of any one of the preceding embodiments, further comprising, after the melt conveying, passing the dry polymer composition through a die to form strands or pellets.

Embodiment 46

The method of any one of the preceding embodiments, wherein one or both of the weight average molecular weight and the number average molecular weight of the wet polymer composition and the dry polymer composition varies by less than or equal to 5%, or less than or equal to 3%.

Embodiment 47

A dry polymer composition prepared by the method of any one of the preceding embodiments.

Embodiment 48

The polymer of Embodiment 47, wherein the dry polymer composition has one or more of a sulfur content of less than or equal to 10 mg of the sulfur per kilogram of the dry polymer composition, and an ionic chloride level of less than or equal to 1 mg of the ionic chloride per kilogram of the dry polymer composition.

Embodiment 49

A molded article made from the composition of Embodiments 47 or 48.

Embodiment 50

The article of Embodiment 49, wherein the article is a lens or a consumer electronic screen, specifically, a screen for use in a mobile phone, a laptop, a desktop, a tablet, a smart watch, or a television.

Embodiment 51

The article of Embodiment 50, wherein the lens is an automotive lens, specifically, a lens used in a headlamp, a tail lamp, or a dome lamp.

In general, the invention can alternately comprise, consist of, or consist essentially of, any appropriate components herein disclosed. The invention can additionally, or alternatively, be formulated so as to be devoid, or substantially free, of any components, materials, ingredients, adjuvants or species used in the prior art compositions or that are otherwise not necessary to the achievement of the function and/or objectives of the present invention.

All ranges disclosed herein are inclusive of the endpoints, and the endpoints are independently combinable with each other (e.g., ranges of "up to 25 wt %, or, more specifically, 5 to 20 wt %", is inclusive of the endpoints and all intermediate values of the ranges of "5 to 25 wt %," etc.). "Combination" is inclusive of blends, mixtures, alloys, reaction products, and the like. Furthermore, the terms "first," "second," and the like, herein do not denote any order, quantity, or importance, but rather are used to denote one element from another. The terms "a" and "an" and "the" herein do not denote a limitation of quantity, and are to be construed to cover both the singular and the plural, unless otherwise indicated herein or clearly contradicted by context. "Or" means "and/or." The suffix "(s)" as used herein is intended to include both the singular and the plural of the term that it modifies, thereby including one or more of that term (e.g., the film(s) includes one or more films). Reference throughout the specification to "one embodiment," "another embodiment," "an embodiment," and so forth, means that a particular element (e.g., feature, structure, and/or characteristic) described in connection with the embodiment is included in at least one embodiment described herein, and may or may not be present in other embodiments. "Optional" or "optionally" means that the subsequently described event or circumstance can or cannot occur, and that the description includes instances where the event occurs and instances where it does not. Unless defined otherwise, technical and scientific terms used herein have the same meaning as is commonly understood by one of skill in the art to which this invention belongs. Unless specifically stated, the test standards are the most recent as of the date of Mar. 15, 2015.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

In addition, it is to be understood that the described elements can be combined in any suitable manner in the various embodiments.

While particular embodiments have been described, alternatives, modifications, variations, improvements, and substantial equivalents that are or can be presently unforeseen can arise to Applicants or others skilled in the art. Accordingly, the appended claims as filed and as they can be amended are intended to embrace all such alternatives, modifications variations, improvements, and substantial equivalents.

The invention claimed is:
1. A method of dewatering a wet polymer composition comprising:
   introducing the wet polymer composition comprising an interfacial polycarbonate powder via a polymer feed location to a powder conveying section of an extruder; wherein the wet polymer composition comprises greater than or equal to 1 wt % of water based on the total weight of the wet polymer composition;

venting the water through a conveying section vent to form a dry polymer composition;

adding an additive; wherein the adding comprises adding an optionally liquid additive composition comprising the additive in the powder conveying section to the dry polymer composition, wherein the adding is optionally performed under nitrogen;

melt kneading the dry polymer composition in a melt kneading section of the extruder to form a polymer melt;

introducing the polymer melt from the melt kneading section directly into a melt seal section located in a melt conveying section; and then conveying the polymer melt in through the remaining melt conveying section of the extruder.

2. A method of dewatering a wet polymer composition comprising:

introducing the wet polymer composition via a polymer feed location to a powder conveying section of an extruder; wherein the wet polymer composition comprises greater than or equal to 1 wt % of water based on the total weight of the wet polymer composition;

venting the water through a conveying section vent to form a dry polymer composition;

melt kneading the dry polymer composition in a melt kneading section of the extruder to form a polymer melt, wherein the melt kneading section comprises a melt kneading block; and introducing the polymer melt from the melt kneading section directly into a melt seal section located in a melt conveying section; wherein the melt seal section comprises a reverse flighted conveying element, a dam ring, a kneading block, and a low shear element; wherein the kneading block comprises a forward kneading block, a neutral kneading block, a reverse kneading block, or a combination comprising at least one of the foregoing; wherein the low shear element imparts a lower shear to the polymer melt than that which is imparted by the melt-kneading block;

conveying the polymer melt through the remaining melt conveying section of the extruder; wherein the conveying introduces a shear to the polymer melt;

venting the polymer melt in the melt conveying section downstream of the melt seal section; and optionally adding an additive.

3. The method of claim 2, wherein the low shear element comprises a screw mixing element, a turbine mixing element, a zahnmisch element, or a combination comprising at least one of the foregoing.

4. The method of claim 1, wherein the additive comprises 0.01 to 1 wt % of a heat stabilizer, 0.01 to 1 wt % of a release agent, 0.01 to 1 wt % of a UV stabilizer, 0 to 1 wt % of a colorant, or a combination comprising at least one of the foregoing, all based on the total weight of the polymer and additive.

5. A method of dewatering a wet polymer composition comprising:

introducing the wet polymer composition via a polymer feed location to a powder conveying section of an extruder; wherein the wet polymer composition comprises greater than or equal to 1 wt % of water based on the total weight of the wet polymer composition;

venting the water through a conveying section vent to form a dry polymer composition;

melt kneading the dry polymer composition in a melt kneading section of the extruder to form a polymer melt;

conveying the polymer melt in a melt conveying section of the extruder; and adding an additive in the powder conveying section, wherein the additive comprises 0.01 to 1 wt % of a heat stabilizer, 0.01 to 1 wt % of a release agent, 0.01 to 1 wt % of a UV stabilizer, 0 to 1 wt % of a colorant, or a combination comprising at least one of the foregoing, all based on the total weight of the polymer and additive.

6. The method of claim 1, wherein the adding comprises adding the liquid additive composition comprising the additive in the powder conveying section to the dry polymer composition.

7. The method of claim 1, wherein the melt kneading section comprises a melt kneading block, and wherein the melt seal comprises a reverse flighted conveying element, a dam ring, a kneading block, and a low shear element; wherein the kneading block comprises a forward kneading block, a neutral kneading block, a reverse kneading block, or a combination comprising at least one of the foregoing; wherein the low shear element imparts a lower shear to the polymer melt than that which is imparted by the melt-kneading block.

8. The method of claim 1, wherein the conveying comprises conveying the polymer melt using a two lobe mixing element.

9. The method of claim 1, further comprising melt filtering the polymer melt after the melt conveying section.

10. The method of claim 1, wherein the extruder has a length to inner diameter ratio of greater than 40.

11. The method of claim 1, wherein the dry polymer composition comprises less than or equal to 0.4 wt % of water and/or wherein the wet polymer composition comprises greater than or equal to 5 wt % of water.

12. The method of claim 1, wherein the adding comprises adding the additive in the melt conveying section and/or wherein the venting occurs at a vacuum pressure of less than or equal to 120 kPa.

13. The method of claim 1, wherein the additive comprises tris(2,4-di-tert-butylphenyl)phosphite, octadecyl-3-(3,5-di-tert.butyl-4-hydroxyphenyl)-propionate, pentaerythritol tetrastearate, stearyl stearate, glycerol monostearate, glycerol tristearate, 2-(2-Hydroxy-5-tert-octylphenyl) benzotriazole, ultramarine blue, or a combination comprising at least one of the foregoing, or the additive comprises tris(2,4-di-tert-butylphenyl)phosphite.

14. The method of claim 1, wherein the wet polymer composition comprises greater than 0 to less than or equal to 5 wt % of halogenated solvent based on the total weight of the wet polymer composition and/or wherein the dry polymer composition comprises less than or equal to 1 ppm of a residual halogenated solvent based on the total weight of the dry polymer composition.

15. The method of claim 1, wherein the wet polymer composition comprises greater than or equal to 5 wt % of water based on the total weight of the wet polymer composition and the dry polymer composition comprises less than 5 wt % of water based on the total weight of the wet polymer composition.

16. The method of claim 1, further comprising introducing the melt polymer to a pressure buildup zone at a distal end of the melt conveying section away from the powder conveying section.

17. A dry polymer composition prepared by the method of claim 1, wherein the dry polymer composition has one or more of a sulfur content of less than or equal to 10 mg sulfur per kilogram of the dry polymer composition, and an ionic chloride level of less than or equal to 1 mg per kilogram of the dry polymer composition.

18. The method of claim 1, further comprising pelletizing the melt and then forming an article from the pellets; wherein the article is a lens; or wherein the article is a consumer electronic screen.

19. The method of claim 1, further comprising introducing the dry polymer composition to a powder seal section located in the powder conveying section directly upstream of the melt kneading section.

20. The method of claim 1, wherein the wherein the conveying the polymer melt through the remaining melt conveying section further comprises introducing the polymer melt to a second melt kneading section in the melt conveying section.

* * * * *